(12) United States Patent
Fischer

(10) Patent No.: US 8,607,823 B2
(45) Date of Patent: Dec. 17, 2013

(54) PRESSURE CONTROL VALVE

(75) Inventor: Thomas H. Fischer, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 151 days.

(21) Appl. No.: 13/177,881

(22) Filed: Jul. 7, 2011

(65) Prior Publication Data

US 2012/0012773 A1  Jan. 19, 2012

Related U.S. Application Data

(60) Provisional application No. 61/363,681, filed on Jul. 13, 2010.

(51) Int. Cl.
  *F16K 11/07* (2006.01)
(52) U.S. Cl.
  USPC .................. 137/625.68; 137/625.38; 251/50
(58) Field of Classification Search
  USPC ............. 137/625.25, 625.38, 625.64, 625.65, 137/625.68; 251/50
  See application file for complete search history.

(56) References Cited

U.S. PATENT DOCUMENTS

| | | | | |
|---|---|---|---|---|
| 4,491,153 A | * | 1/1985 | Bartholomaus | 137/625.65 |
| 6,321,767 B1 | * | 11/2001 | Seid et al. | 137/15.21 |
| 6,581,634 B2 | * | 6/2003 | Najmolhoda et al. | 137/545 |
| 6,904,937 B2 | | 6/2005 | Fischer | |
| 6,938,873 B2 | | 9/2005 | Fischer | |
| 7,069,951 B2 | * | 7/2006 | Cornea | 137/625.68 |

* cited by examiner

*Primary Examiner* — John Rivell
*Assistant Examiner* — R. K. Arundale
(74) *Attorney, Agent, or Firm* — Thomas N. Twomey

(57) ABSTRACT

A valve assembly includes a housing with a supply port receiving working fluid from a working fluid source, a control port connected to a working device, and a vent port for returning working fluid to the working fluid source. A spool with a spool bore in fluid communication with the control port controls the flow of working fluid between the supply port and the control port and between the control port and the vent port. An actuator assembly selectively alters the position of the spool. In a high pressure mode, the supply port is in fluid communication with the spool bore at a first pressure. In a pressure relief mode, the vent port is in fluid communication with the spool bore. In a pressure regulating mode, the supply port is in fluid communication with the spool bore at a second pressure which is less than the first pressure.

13 Claims, 2 Drawing Sheets

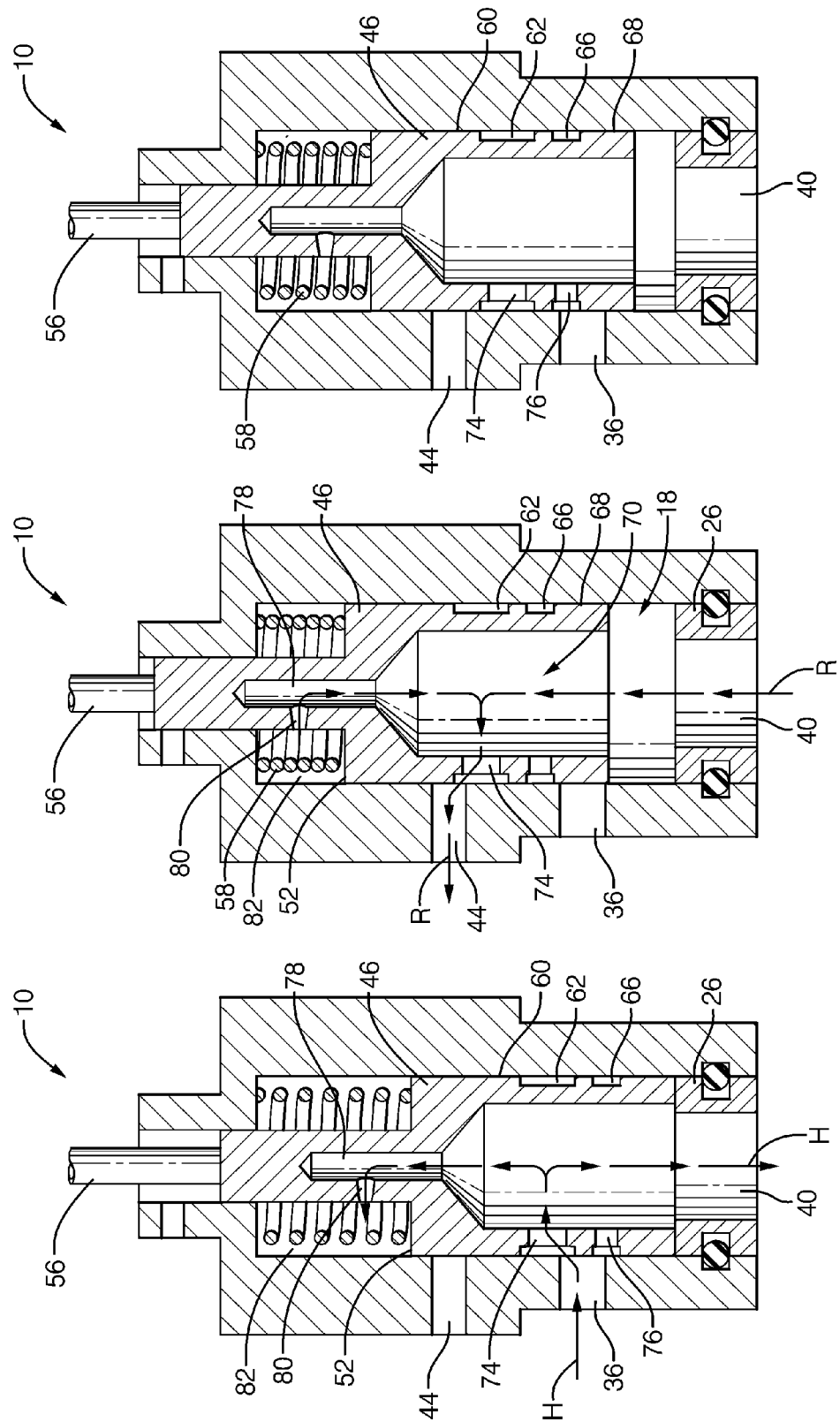

PRESSURE CONTROL VALVE

CROSS-REFERENCE TO RELATED APPLICATIONS

This application claims the benefit of U.S. provisional patent application Ser. No. 61/363,681 filed Jul. 13, 2010, the disclosure of which is hereby incorporated by reference in its entirety.

TECHNICAL FIELD OF INVENTION

The present invention relates to spool-type valves; and more particularly, to such valves as are commonly employed for switching and controlling flow of activation and lubrication fluids to various components of internal combustion engines; and most particularly, to switchable oil control valves having a spool for regulating oil pressure and for switching between high pressure mode and pressure relief mode.

BACKGROUND OF INVENTION

Spool-type valves for controllably diverting the flow of fluids are well known. In a typical spool valve, a piston or "spool," having a plurality of annular grooves in the spool wall is slidably disposed within a cylindrical body that is also provided with a plurality of internal annular grooves and radial ports extending through the body wall. The spool is variably positionable axially within the body to cause selected ports in the spool to align with grooves and ports in the body, thereby permitting flow of fluid from outside the body through first aligned ports into the interior of the spool and out through second aligned ports. A plurality of different flow paths typically is created by positioning the spool at a plurality of different axial positions within the body. Typically, the spool is connected to a linear solenoid actuator, whereby the spool may be axially positioned by signals from a controller such as a computerized engine control module, although other actuators such as pneumatic and hydraulic actuators can be used.

A common usage for an oil-control spool valve is to variably actuate engine control subsystems such as camshaft phasers, variable valve activation (VVA) mechanisms, and multi-step or valve deactivation mechanisms. In a two step valve mechanism, for example, the mechanism selects the engine intake valve lift profile (low or high) of an intake valve camshaft using a hydraulically activated roller finger follower (RFF).

In a simple configuration of this example, a spool valve supplies high pressure oil, typically from an engine-driven oil pump, to activate the RFF, and shuts off the oil supply to deactivate and drain pressure from the RFF. However, it is desirable that in RFF-deactivation mode the oil supply not be completely shut off, as other components of the valve train, such as camshaft lobes and rocker arms, continue to require flow of oil for lubrication.

U.S. Pat. No. 6,904,937 discloses a piloted spool-type valve that is switchable not simply between on and off modes but also between a pressure high enough for RFF activation and a controlled pressure sufficient for lubrication but insufficient for RFF activation. A piloted spool-type valve requires two spools to function; a regulating spool and a pilot spool. The regulating spool controls a relatively high flow of working fluid through the valve by being axially displaced in the valve. A high force is required to axially displace the regulating spool because of the high hydraulic force acting on the regulating spool as a result of the high flow of working fluid being directed by the regulating spool. The force required to axially displace the regulating spool is higher than can practically be supplied by a mechanical actuator. The pilot spool is therefore provided to be axially displaced in the valve in order to direct a low flow of working fluid which in turn axially displaces the regulating spool. A mechanical actuator can provide the force needed to axially displace the pilot spool in the valve since the pilot spool is subjected to a smaller hydraulic force from the working fluid because of the low flow of working fluid being directed. While a piloted spool-type valve works well in an application with a relatively high flow requirement, a piloted spool-type valve adds unnecessary complexity and expense when used in an application that has lower flow requirements and thus produces lower hydraulic forces on the regulating spool.

U.S. patent application No. 12/718,013 filed on Mar. 5, 2010 and commonly assigned to Applicant discloses a direct acting, i.e. non-piloted, oil control valve assembly that is switchable not simply between on and off modes but also between a pressure high enough for RFF activation and a controlled pressure low enough for lubrication but insufficient for RFF activation. In this example, the control port is arranged to extend radially outward from the oil control valve assembly while the vent port is fed by a passage that extends axially through the spool. However, some applications exist where an oil control valve assembly with a control port that extends axially outward therefrom is needed. The vent path of Ser. No. 12/718,013 may make it difficult to apply an axially extending control port thereto.

What is needed is a simpler, direct-acting, i.e. non-piloted, oil control valve assembly that is switchable not simply between on and off modes but also between a pressure high enough for RFF activation and a controlled pressure low enough for lubrication but insufficient for RFF activation. What is also needed is such an oil control valve assembly with a control port that extends axially therefrom.

SUMMARY OF THE INVENTION

Briefly described, a valve assembly is provided having a housing with a longitudinal bore, a supply port in fluid communication with the longitudinal bore for receiving working fluid from a working fluid source, a control port in fluid communication with the longitudinal bore for communicating working fluid to and from a working device, and a vent port in fluid communication with the longitudinal bore for returning working fluid to the working fluid source. The valve assembly includes a spool slideably disposed in the longitudinal bore for controlling the flow of working fluid between the supply port and the control port and between the control port and the vent port. The spool includes a spool bore extending axially thereinto and in fluid communication with the control port. The valve assembly also includes an actuator assembly for selectively altering the position of the spool in the longitudinal bore to achieve a valve mode selected from the group consisting of high pressure mode, pressure relief mode, and pressure regulating mode. The supply port is in fluid communication with the spool bore at a first pressure when the spool is positioned in the longitudinal bore to achieve the high pressure mode, thereby activating the working device. The vent port is in fluid communication with the spool bore when the spool is positioned in the longitudinal bore to achieve the pressure relief mode, thereby deactivating the working device. The supply port is in fluid communication with the spool bore at a second pressure which is less than the first pressure when the spool is positioned in the longitudinal bore to achieve the pressure regulating mode, thereby lubricating the working device without activating the working device.

BRIEF DESCRIPTION OF DRAWINGS

This invention will be further described with reference to the accompanying drawings in which:

FIG. 2 is a cross section of a valve assembly positioned in high pressure mode in accordance with the present invention;

FIG. 3 is a cross section of a valve assembly positioned in pressure relief mode in accordance with the present invention; and FIG. 4 is a cross section of a valve assembly positioned in pressure regulating mode in accordance with the present invention.

DETAILED DESCRIPTION OF INVENTION

Figure 1:
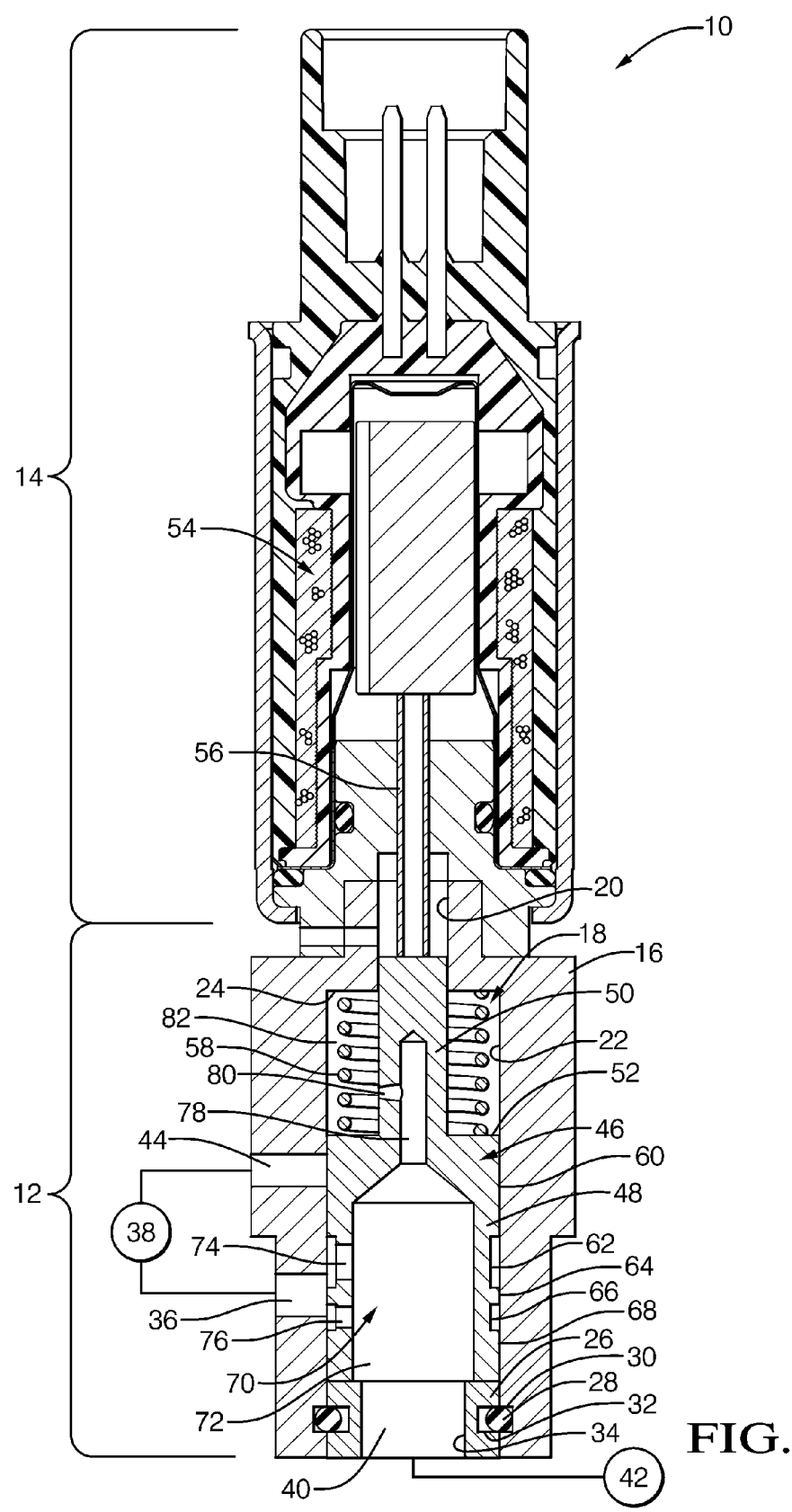
FIG. 1 is a cross section of a valve assembly in accordance with the present invention.

In accordance with a preferred embodiment of this invention and referring to FIG. 1, a valve assembly 10 is shown. Valve assembly 10 includes spool valve assembly 12 which is connected to actuator assembly 14. Actuator assembly 14 affects the axial placement spool valve assembly 12 within housing 16 to achieve a valve mode selected from the group of high pressure mode (FIG. 2), pressure relief mode (FIG. 3), and pressure regulating mode (FIG. 4).

Still referring to FIG. 1, housing 16 includes stepped longitudinal bore 18 extending axially through housing 16. Stepped longitudinal bore 18 includes reduced section 20 at the end of housing 16 closest to actuator assembly 14 and enlarged section 22 extending axially away from reduced section 20. Enlarged section 22 has a diameter that is larger than the diameter of reduced section 20. Housing shoulder 24 is defined by the surface connecting reduced section 20 to enlarged section 22. Housing 16 includes spool stop 26 located within a portion of enlarged section 22 that is distal from actuator assembly 14. Spool stop 26 may be retained within enlarged section 22, for example, by retaining ring 28 fitted within housing annular groove 30 and spool stop annular groove 32. Housing annular groove 30 is formed within the inside diameter of enlarged section 22 while spool stop annular groove 32 is formed in the outside diameter of spool stop 26. Spool stop 26 includes central through bore 34 for providing fluid communication therethrough.

Supply port 36 extends radially outward through housing 16 to provide fluid communication with stepped longitudinal bore 18 for selectively receiving working fluid from working fluid source 38. Control port 40 extends axially outward through housing 16 to provide fluid communication with stepped longitudinal bore 18 for selectively communicating working fluid to and from working device 42. Vent port 44 extends radially outward through housing 16 to provide fluid communication with stepped longitudinal bore 18 for selectively returning working fluid to working fluid source 38.

Spool 46 includes first section 48 which is slidably disposed within enlarged section 22 of stepped longitudinal bore 18. Spool 46 also includes second section 50 which is smaller in diameter than first section 48 and which is slidably disposed within reduced section 20 of stepped longitudinal bore 18. Second section 50 of spool 46 and reduced section 20 of stepped longitudinal bore 18 are sized to substantially prevent working fluid from passing therebetween. Any working fluid that may pass therebetween is vented, for example, to an area of an internal combustion engine (not shown) where the working fluid can be returned to working fluid source 38. Although not shown, working fluid that may pass between second section 50 of spool 46 and reduced section 20 of stepped longitudinal bore 18 may be vented to vent port 44 through a passage in housing 16. Spool shoulder 52 is defined by the surface connecting first section 48 to second section 50. Spool 46 controls the flow of working fluid between supply port 36 and control port 40, the flow of working fluid between control port 40 and vent port 44, and the pressure at control port 40.

Actuator assembly 14 includes solenoid 54 for producing linear motion and also includes connecting rod 56 for mechanically transmitting linear motion from solenoid 54 to spool 46 when switching from at least one of the valve modes to another of the valve modes. In this way, only one spool 46 is needed because actuator assembly 14 directly/mechanically displaces spool 46 when switching from at least one of the valve modes to another of the valve modes, thereby eliminating the need for a second spool to direct working fluid to hydraulically displace spool 46 when switching from at least one of the valve modes to another of the valve modes. Solenoids are well known to those skilled in the art and will not be further discussed herein. Connecting rod 56 may be provided to be structurally separate from spool 46 and thereby allow for misalignment between connecting rod 56 and spool 46. Alternatively, connecting rod 56 may be rigidly connected to spool 46.

Pressure regulating spring 58 is provided to bias spool 46 away from actuator assembly 14 and radially surrounds second section 50 of spool 46. Pressure regulating spring 58 is grounded by housing shoulder 24 and is disposed axially between spool shoulder 52 and housing shoulder 24. Pressure regulating spring 58 will be discussed further when the operation of valve assembly 10 is described.

Spool 46 is provided with vent land 60 which is dimensioned to be in close running tolerance with enlarged section 22 of stepped longitudinal bore 18. Vent land 60 substantially prevents working fluid from being communicated directly to vent port 44 from supply port 36. An insignificant amount of working fluid may leak past vent land 60 from supply port 36 to vent port 44, but vent land 60 still substantially prevents working fluid from being communicated directly to vent port 44 from supply port 36.

Spool 46 is further provided with high pressure annulus 62 which is adjacent vent land 60 and which is selectively in fluid communication with supply port 36 in at least one mode of operation and is selectively in fluid communication with vent port 44 in at least a second mode of operation. High pressure annulus 62 is dimensioned to be smaller in diameter than vent land 60.

Spool 46 is further provided with intermediate land 64 which is adjacent high pressure annulus 62 and which is dimensioned to be in close running tolerance with enlarged section 22 of stepped longitudinal bore 18. Intermediate land 64 substantially prevents working fluid from being communicated from supply port 36 directly to high pressure annulus 62 when in pressure regulating mode (FIG. 4). An insignificant amount of working fluid may leak past intermediate land 64 from supply port 36 directly to high pressure annulus 62, but intermediate land 64 still substantially prevents working fluid from being communicated from supply port 36 directly to high pressure annulus 62 when in pressure regulating mode.

Spool 46 is further provided with metering annulus 66 which is adjacent intermediate land 64 and which is selectively in fluid communication with supply port 36. Metering annulus 66 is dimensioned to be smaller in diameter than intermediate land 64.

Spool 46 is further provided with high pressure land 68 which is adjacent metering annulus 66 and is dimensioned to be in close running tolerance with enlarged section 22 of stepped longitudinal bore 18. High pressure land 68 substantially prevents working fluid from being communicated from supply port 36 directly to control port 40 when in pressure relief mode (FIG. 3) and when in pressure regulating mode (FIG. 4). An insignificant amount of working fluid may leak past high pressure land 68 from supply port 36 directly to control port 40, but high pressure land 68 still substantially prevents working fluid from being communicated from supply port 36 directly to control port 40 when in pressure relief and pressure regulating modes. High pressure land 68 also substantially prevents working fluid from being communicated directly to metering annulus 66 when in pressure relief mode. An insignificant amount of working fluid may leak past high pressure land 68 from supply port 36 directly to metering annulus 66, but high pressure land 68 still substantially prevents working fluid from being communicated from supply port 36 directly to metering annulus 66 when in pressure relief mode.

Spool 46 is further provided with spool bore 70 extending axially into spool 46 from the end of spool 46 opposite second section 50. Spool bore 70 includes supply chamber 72 which extends axially into first section 48 of spool 46. Supply chamber 72 is in fluid communication with high pressure annulus 62 through high pressure passage 74, and is also in fluid communication with metering annulus 66 through metering orifice 76. Spool bore 70 also includes balancing passage 78 which extends axially from supply chamber 72 into second section 50 of spool 46. Balancing passage 78 is in fluid communication with the outside surface of second section 50 through connecting passage 80 which extends radially outward from balancing passage 78. The function of the various elements of spool 46 will be discussed further when the operation of valve assembly 10 is described.

Balancing chamber 82 is defined by the volume that is bounded radially by second section 50 of spool 46 and enlarged section 22 of stepped longitudinal bore 18, and which is bounded axially by housing shoulder 24 and spool shoulder 52. Pressure regulating spring 58 is disposed within balancing chamber 82. The function of balancing chamber 82 will be discussed further when the operation of valve assembly 10 is described.

In operation, and now referring to FIG. 2, valve assembly 10 may be selectively placed in high pressure mode. This may be desired, for example, when switching a switchable valve train device from a first mode of operation to a second mode of operation. When placed in high pressure mode, solenoid 54 (FIG. 1) is energized which causes connecting rod 56 to be displaced axially toward spool 46. The axial displacement of connecting rod 56 axially displaces spool 46 until spool 46 contacts spool stop 26. When spool 46 is in this position, control port 40 is not in fluid communication with vent port 44 because vent land 60 of spool 46 is positioned to block vent port 44. An insignificant amount of working fluid may leak past vent land 60 to vent port 44 while still substantially sealing control port 40 from vent port 44. At the same time, supply port 36 is in fluid communication with control port 40, thereby causing essentially full pressure from working fluid source 38 (FIG. 1) to be applied to control port 40 through at least high pressure annulus 62/high pressure passage 74. Metering annulus 66/metering orifice 76 may also provide fluid communication from supply port 36 to control port 40 in high pressure mode in addition to high pressure annulus 62/high pressure passage 74. An insignificant pressure drop may occur from working fluid source 38 to control port 40 as long as the pressure at control port 40 is sufficient to perform the desired action. The flow path of working fluid when valve assembly 10 is in high pressure mode is shown by Arrow H.

In order to minimize the force required by solenoid 54 to displace spool 46 when valve assembly 10 is placed in high pressure mode, working fluid is supplied to balancing chamber 82 through balancing passage 78 and connecting passage 80. In this way, working fluid is able to react against spool shoulder 52 in order to offset the hydraulic forces acting on spool 46 in the opposite direction. When valve assembly 10 is placed in high pressure mode, working fluid fills balancing chamber 82 as the volume of balancing chamber 82 increases due to movement of spool 46. In order for proper function of valve assembly 10, the effective hydraulic area available for the working fluid to urge spool 46 away from actuator assembly 14 is made less than the effective hydraulic area available for the working fluid to urge spool 46 toward actuator assembly 14. In other words, the area of spool shoulder 52 is less that the area of the surfaces of spool 46 that react against the working fluid to urge spool 46 toward actuator assembly 14.

In operation, and now referring to FIG. 3, valve assembly 10 may be selectively placed in pressure relief mode. This may be desired, for example, when switching a switchable valve train device from the second mode of operation to the first mode of operation. Pressure relief mode occurs in the brief time period after solenoid 54 (FIG. 1) is de-energized. When solenoid 54 is de-energized, pressurized working fluid acting on the inside surfaces of spool bore 70 of spool 46 causes connecting rod 56 and spool 46 to be urged toward actuator assembly 14 (FIG. 1), thereby causing pressure regulating spring 58 to be compressed. When spool 46 is in the pressure relief position in stepped longitudinal bore 18, supply port 36 is not in fluid communication with control port 40 because high pressure land 68 of spool 46 is positioned to block supply port 36. An insignificant amount of working fluid may leak past high pressure land 68 from supply port 36 to control port 40 while still substantially sealing supply port 36 from control port 40. At the same time, control port 40 is in fluid communication with vent port 44 through high pressure passage 74/high pressure annulus 62. This allows pressurized working fluid that had been supplied to control port 40 when valve assembly 10 was placed in high pressure mode to now be communicated to vent port 44, thereby relieving pressure from control port 40. As the volume of balancing chamber 82 decreases due to movement of spool 46, working fluid flows out of balancing chamber 82 through connecting passage 80 and balancing passage 78 to vent port 44. The flow path of working fluid when valve assembly 10 is in pressure relief mode is shown by Arrow R.

In operation, and now referring to FIG. 4, valve assembly 10 may be selectively placed in pressure regulating mode. This may be desired, for example, when working fluid pressure only sufficient to lubricate a switchable valve train device is needed without switching between the first and second modes of operation. Pressure regulating mode occurs when solenoid 54 (FIG. 1) is de-energized and after high pressure working fluid has been relieved from control port 40 to vent port 44 when valve assembly 10 was in pressure relief mode. When transitioning from pressure relief mode to pressure regulating mode, compressed pressure regulating spring 58 urges spool 46 away from actuator assembly 14 (FIG. 1). When spool 46 is urged away from actuator assembly 14, control port 40 is no longer in fluid communication with vent port 44 because vent land 60 of spool 46 is positioned to block vent port 44. An insignificant amount of working fluid may leak past vent land 60 to vent port 44 while still substantially sealing control port 40 from vent port 44. At the same time, working fluid is prevented from being communicated from supply port 36 to control port 40 through high pressure annulus 62/high pressure passage 74. Instead, working fluid is communicated from supply port 36 to control port 40 through metering annulus 66/metering orifice 76 which are now aligned with supply port 36. However, metering orifice 76 is sized to provide a pressure differential between the pressure at supply port 36 and the pressure at control port 40. More specifically, the pressure at control port 40 is less than the pressure at supply port 36 while still sufficient to lubricate working device 42 (FIG. 1). When valve assembly 10 is placed in pressure regulating mode, the pressure at control port 40 is also less than the pressure at control port 40 when valve assembly 10 is placed in high pressure mode and is insufficient to perform the desired action on working device 42 (FIG. 1) that can be done when in high pressure mode.

Pressure regulating spring 58 is selected to provide a spring force that will regulate the pressure at control port 40 to a desired level when valve assembly 10 is placed in pressure regulating mode. As working fluid is used to lubricate working device 42, additional working fluid is supplied to working device 42 through metering annulus 66/metering orifice 76. However, if the pressure at control port 40 increases to a predetermined level, working fluid will react against the inside surfaces of spool bore 70 and the axial end surface of spool 46 distal from second section 50 to urge spool 46 toward actuator assembly 14. This will first result in an additional restriction of working fluid through metering annulus 66/metering orifice 76 because the size of metering orifice 76 will be effectively reduced since it will be partially covered by enlarged section 22 of stepped longitudinal bore 18. If the increased restriction through metering annulus 66/metering orifice 76 is not sufficient to overcome the high pressure condition at control port 40, working fluid will continue to react against the inside surfaces of spool bore 70 of spool 46 to urge spool 46 further toward actuator assembly 14 until control port 40 can bleed off the excessive pressure to vent port 44 through high pressure annulus 62/high pressure passage 74. When the high pressure condition at control port 40 has been resolved, pressure regulating spring 58 will urge spool 46 away from actuator assembly 14 until control port 40 is no longer in fluid communication with vent port 44 and until supply port 36 is again in fluid communication with control port 40 through metering annulus 66/metering orifice 76. In this way, pressure is regulated at control port 40.

While this invention has been described in terms of preferred embodiments thereof, it is not intended to be so limited, but rather only to the extent set forth in the claims that follow.

I claim:

1. A valve assembly having a housing with a longitudinal bore, a supply port in fluid communication with said longitudinal bore for receiving working fluid from a working fluid source, a control port in fluid communication with said longitudinal bore for communicating working fluid to and from a working device, and a vent port in fluid communication with said longitudinal bore for returning working fluid to said working fluid source, said valve assembly comprising:

a spool slideably disposed in said longitudinal bore for controlling the flow of working fluid between said supply port and said control port and between said control port and said vent port, said spool having a spool bore extending axially thereinto and in fluid communication with said control port, a high pressure passage to provide fluid communication between said supply port and said spool bore, and a metering orifice to provide fluid communication between said inlet port and said spool bore; and an actuator assembly for selectively altering the position of said spool in said longitudinal bore to achieve a valve mode selected from the group consisting of a high pressure mode, a pressure relief mode, and a pressure regulating mode;

wherein said supply port is in fluid communication with said spool bore through said high pressure passage at a first pressure when said spool is positioned in said longitudinal bore to achieve said high pressure mode, thereby activating said working device;

wherein said vent port is in fluid communication with said spool bore when said spool is positioned in said longitudinal bore to achieve said pressure relief mode, thereby deactivating said working device; and wherein said supply port is in fluid communication with said spool bore through said metering orifice at a second pressure which is less than said first pressure when said spool is positioned in said longitudinal bore to achieve said pressure regulating mode such that said high pressure passage is blocked and said metering orifice is aligned with said supply port, thereby lubricating said working device without activating said working device.

2. A valve assembly as in claim 1 wherein said high pressure passage extends radially through said spool and said metering orifice extends radially through said spool.

3. A valve assembly as in claim 1 wherein said high pressure passage is larger in diameter than said metering orifice.

4. A valve assembly as in claim 1 wherein at least one of said high pressure passage and said metering orifice is aligned with said supply port to provide fluid communication from said supply port to said spool bore at said first pressure when said spool is positioned in said longitudinal bore to achieve said high pressure mode.

5. A valve assembly as in claim 4 wherein said high pressure passage is aligned with said vent port to provide fluid communication from said spool bore to said vent port when said spool is positioned in said longitudinal bore to achieve said pressure relief mode.

6. A valve assembly as in claim 1 further comprising a balancing chamber defined axially and radially between said spool and said longitudinal bore, wherein said balancing chamber is in fluid communication with said spool bore;

wherein working fluid enters said balancing chamber to assist said actuator assembly in positioning said spool in said spool bore when said spool is positioned in said longitudinal bore to achieve said high pressure mode; and wherein working fluid exits said balancing chamber when said spool is positioned in said longitudinal bore to achieve said pressure relief mode.

7. A valve assembly as in claim 6 further comprising a pressure regulating spring, wherein said pressure regulating spring affects the position of said spool within said longitudinal bore for limiting the pressure of working fluid at said control port when said spool is positioned in said longitudinal bore to achieve said pressure relief mode.

8. A valve assembly as in claim 7 wherein said pressure regulating spring is disposed within said balancing chamber.

9. A valve assembly having a housing with a longitudinal bore, a supply port in fluid communication with said longitudinal bore for receiving working fluid from a working fluid source, a control port in fluid communication with said longitudinal bore for communicating working fluid to and from a working device, and a vent port in fluid communication with said longitudinal bore for returning working fluid to said working fluid source, said valve assembly comprising:
- a spool slideably disposed in said longitudinal bore for controlling the flow of working fluid between said supply port and said control port and between said control port and said vent port, said spool having a spool bore extending axially thereinto and in fluid communication with said control port, a high pressure passage to provide fluid communication between said supply port and said spool bore, and a metering orifice to provide fluid communication between said inlet port and said spool bore; and
- an actuator assembly for selectively altering the position of said spool in said longitudinal bore to achieve a valve mode selected from the group consisting of a high pressure mode, a pressure relief mode, and a pressure regulating mode;
- wherein said supply port is in fluid communication with said spool bore through said high pressure passage at a first pressure when said spool is positioned in said longitudinal bore to achieve said high pressure mode, thereby activating said working device;
- wherein said vent port is in fluid communication with said spool bore when said spool is positioned in said longitudinal bore to achieve said pressure relief mode, thereby deactivating said working device;
- wherein said supply port is in fluid communication with said spool bore through said metering orifice at a second pressure which is less than said first pressure when said spool is positioned in said longitudinal bore to achieve said pressure regulating mode, thereby lubricating said working device without activating said working device;
- wherein at least one of said high pressure passage and said metering orifice is aligned with said supply port to provide fluid communication from said supply port to said spool bore at said first pressure when said spool is positioned in said longitudinal bore to achieve said high pressure mode;
- wherein said high pressure passage is aligned with said vent port to provide fluid communication from said spool bore to said vent port when said spool is positioned in said longitudinal bore to achieve said pressure relief mode; and
- wherein said high pressure passage is blocked and said metering orifice is aligned with said supply port to provide fluid communication from said supply port to of said spool bore at said second pressure when said spool is positioned in said longitudinal bore to achieve said pressure regulating mode.

10. A valve assembly as in claim 9 further comprising a balancing chamber defined axially and radially between said spool and said longitudinal bore,
- wherein said balancing chamber is in fluid communication with said spool bore;
- wherein working fluid enters said balancing chamber to assist said actuator assembly in positioning said spool in said spool bore when said spool is positioned in said longitudinal bore to achieve said high pressure mode; and
- wherein working fluid exits said balancing chamber when said spool is positioned in said longitudinal bore to achieve said pressure relief mode.

11. A valve assembly as in claim 10 further comprising a pressure regulating spring, wherein said pressure regulating spring affects the position of said spool within said longitudinal bore for limiting the pressure of working fluid at said control port when said spool is positioned in said longitudinal bore to achieve said pressure relief mode.

12. A valve assembly as in claim 11 wherein said pressure regulating spring is disposed within said balancing chamber.

13. A valve assembly having a housing with a longitudinal bore, a supply port in fluid communication with said longitudinal bore for receiving working fluid from a working fluid source, a control port in fluid communication with said longitudinal bore for communicating working fluid to and from a working device, and a vent port in fluid communication with said longitudinal bore for returning working fluid to said working fluid source, said valve assembly comprising:
- a spool slideably disposed in said longitudinal bore for controlling the flow of working fluid between said supply port and said control port and between said control port and said vent port, said spool having a spool bore extending axially thereinto and in fluid communication with said control port, a high pressure passage to provide fluid communication between said supply port and said spool bore, and a metering orifice to provide fluid communication between said inlet port and said spool bore;
- an actuator assembly for selectively altering the position of said spool in said longitudinal bore to achieve a valve mode selected from the group consisting of a high pressure mode, a pressure relief mode, and a pressure regulating mode;
- a balancing chamber in fluid communication with said spool bore and defined axially and radially between said spool and said longitudinal bore; and
- a pressure regulating spring disposed within said balancing chamber;
- wherein said supply port is in fluid communication with said spool bore through said high pressure passage at a first pressure when said spool is positioned in said longitudinal bore to achieve said high pressure mode, thereby activating said working device;
- wherein said vent port is in fluid communication with said spool bore when said spool is positioned in said longitudinal bore to achieve said pressure relief mode, thereby deactivating said working device;
- wherein said supply port is in fluid communication with said spool bore through said metering orifice at a second pressure which is less than said first pressure when said spool is positioned in said longitudinal bore to achieve said pressure regulating mode, thereby lubricating said working device without activating said working device;
- wherein working fluid enters said balancing chamber to assist said actuator assembly in positioning said spool in said spool bore when said spool is positioned in said longitudinal bore to achieve said high pressure mode;
- wherein working fluid exits said balancing chamber when said spool is positioned in said longitudinal bore to achieve said pressure relief mode; and
- wherein said pressure regulating spring affects the position of said spool within said longitudinal bore for limiting the pressure of working fluid at said control port when said spool is positioned in said longitudinal bore to achieve said pressure relief mode.

* * * * *